Dec. 14, 1965  D. LYLE  3,222,884
SPINDLE COUPLING
Filed May 11, 1964
Fig.1.
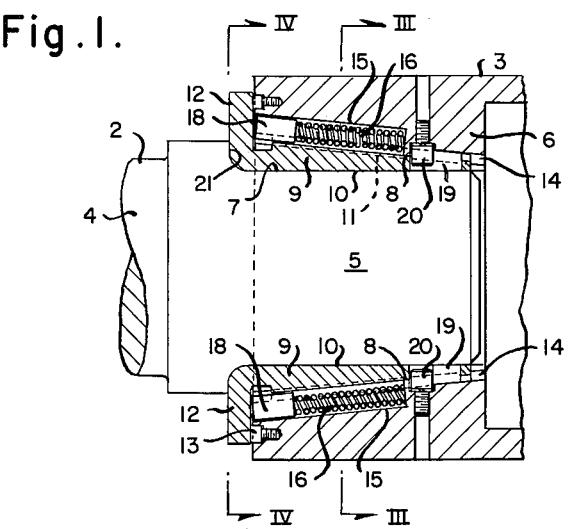
Fig.2.
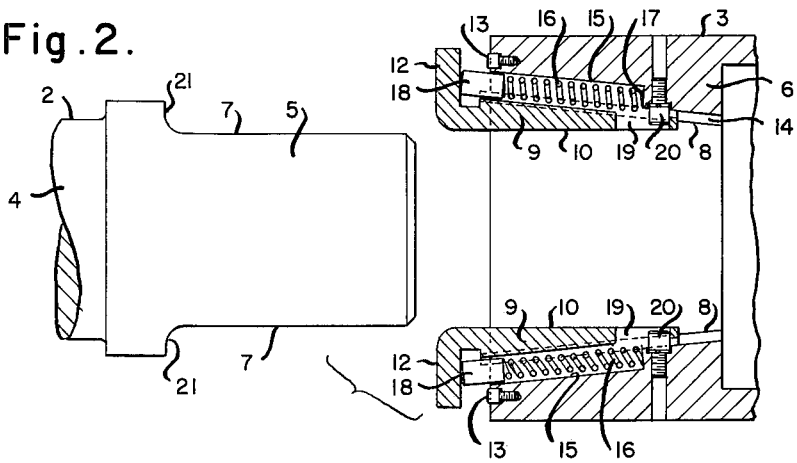
Fig.3.  Fig.4.
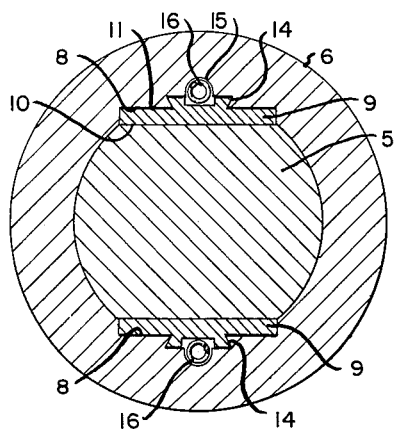
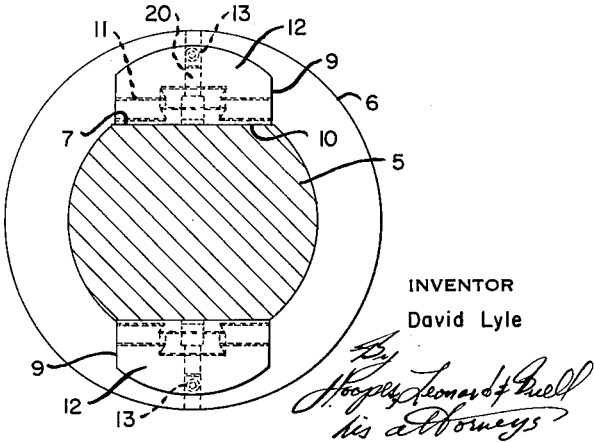
INVENTOR
David Lyle

United States Patent Office 3,222,884
Patented Dec. 14, 1965

3,222,884
SPINDLE COUPLING
David Lyle, Mount Lebanon, Pa., assignor to Blaw-Knox Company, Pittsburgh, Pa., a corporation of Delaware
Filed May 11, 1964, Ser. No. 366,483
8 Claims. (Cl. 64—1)

This invention relates to spindle couplings and particularly couplings for connecting driving spindles to devices such, for example, as rolling mill rolls, to be driven thereby. The invention further relates to spindle couplings in which one of the coupled elements has a projection or male coupling member extending into a socket or female coupling member in the other element.

My spindle coupling is of general utility but perhaps finds its most common usage in rolling mills for coupling rolls for reducing metal to the driving means therefor. For purposes of explanation and illustration the invention will be described as embodied in a spindle coupling for rolling mills.

A rolling mill roll has a roll body for acting on material being rolled and necks at opposite ends of the body generally of reduced diameter in comparison with the body. In any event a rolling mill roll has between the roll body and each neck a shoulder facing toward the end of the roll. The necks of the roll enter female spindles or sockets one of which is connected with driving means for rotating the roll. It is important that an effective driving connection be established between the roll and the driving spindle while at the same time providing for easy and rapid roll changes. A roll change of course requires withdrawal of the roll neck from the driving spindle and insertion of the neck of another roll into the driving spindle in proper relation thereto so that rotation of the spindle causes rotation of the roll.

I have devised an improved form of spindle coupling facilitating roll changes while insuring a proper driving connection between the driving spindle and the roll. My spindle coupling comprises a cylindrical male coupling member having a recessed portion at a side thereof providing a surface extending generally longitudinally of the male coupling member, a female coupling member having a socket receiving the male coupling member, the female coupling member having a generally longitudinally extending surface disposed opposite said surface of the male coupling member when the male coupling member is inserted into the female coupling member, the opposed surfaces of the male and female coupling members being disposed at an angle to each other providing, when the male coupling member is inserted into the female coupling member, a space therebetween tapering from relatively small to relatively great width in the direction from the bottom of the socket of the female coupling member outwardly and a generally wedge-shaped device in said space connecting the coupling members to turn together when one of them is driven. The generally wedge-shaped device (hereinafter for brevity generally referred to simply as a "wedge") is preferably mounted on one of the coupling members for generally longitudinal movement therealong so as to adapt it to move into and substantially fill the space between the coupling members when the male coupling member is inserted into the female coupling member. Desirably a longitudinal sliding dovetail connection is provided between the wedge and one of the coupling members, preferably the female coupling member.

Desirably the male coupling member has a portion which engages the wedge and pushes the wedge into the space between the coupling members after the male coupling member is inserted into the female coupling member. The wedge desirably has a portion engaging a portion of the female coupling member limiting the extent to which the wedge enters the space between the coupling members.

Whether or not a connection of dovetail form is employed, the wedge is preferably mounted on the female coupling member for generally longitudinal movement therealong and the male coupling member has a portion which engages the wedge and pushes the wedge into the space between the coupling members when the male coupling member is inserted into the female coupling member and the wedge has a lateral extension engaging a portion of the female coupling member limiting the extent to which the wedge enters the space between the coupling members. Adjustable means are preferably provided acting between the female coupling member and the wedge as the wedge enters the space between the coupling members predeterminedly limiting the extent to which the wedge enters the space between the coupling members.

Spring means are preferably provided acting between the female coupling member and the wedge urging the wedge outwardly of the female coupling member. Means are preferably provided limiting outward movement of the wedge. The wedge may have an opening extending transversely therethrough and a stud may be provided which is connected with the female coupling member and projects into the opening in the wedge to limit movement of the wedge relatively to the female coupling member.

In a preferred construction each of the male coupling member and the female coupling member has two generally diametrically opposed surfaces providing two spaces each for reception of a generally wedge-shaped device. Each such surface of the male coupling member is preferably flat and desirably extends parallel to the axis of the male coupling member. The opposed surfaces of the female coupling member may also be flat and may diverge in the direction outwardly of the female coupling member.

Other details, objects and advantages of the invention will become apparent as the following description of a present preferred embodiment thereof proceeds.

In the accompanying drawings I have shown a present preferred embodiment of the invention in which FIGURE 1 is a cross-sectional view through a spindle coupling embodying my invention showing the male and female coupling members engaged;

FIGURE 2 is a view similar to FIGURE 1 but showing the coupling members disengaged;

FIGURE 3 is a transverse cross-sectional view taken on the line III—III of FIGURE 1; and FIGURE 4 is a transverse cross-sectional view taken on the line IV—IV of FIGURE 1.

Referring now more particularly to the drawings, the spindle coupling illustrated is for drivingly connecting a rolling mill roll 2 with a driving spindle 3. The rolling mill roll 2 has a body 4 and a reduced neck 5 at each end. The driving spindle 3 may be connected in conventional manner (not shown) with driving means whereby it may be rotated about its axis. It consists of a female coupling member 6 having a socket adapted to receive one of the roll necks 5 constituting the male coupling member of the spindle coupling.

The roll neck 5 shown in the drawings is of generally cylindrical shape but having opposed flat surfaces 7 which in the form shown are planar, parallel to each other and parallel to the roll axis. It should here be explained, however, that the surfaces 7 may be other than flat so long as the elements cooperating therewith are conformably shaped. This also applies to the opposed surfaces of the female coupling member presently to be described. Furthermore, although in the structure illustrated each of the male and female coupling members has two opposed cooperating surfaces it is possible to embody the invention in a structure in which the male and female coupling members have only one pair of cooperating surfaces, or each of the male and female coupling members may have more than two pairs of cooperating surfaces.

In the form shown the female coupling member 6 has opposed flat or planar surfaces 8 which are inclined away from each other outwardly of the female coupling member 6 so that when the male coupling member 5 is introduced into the female coupling member 6 generally wedge-shaped spaces are provided between the respective surfaces 7 of the male coupling member 5 and the surfaces 8 of the female coupling member 6.

A generally wedge-shaped device 9 is adapted to be inserted into the space between each of the surfaces 7 of the male coupling member 5 and the corresponding surface 8 of the female coupling member 6. Since the spindle coupling shown is symmetrical description of one side suffices for both sides.

Each wedge 9 has a flat face 10 adapted to bear against one of the surfaces 7 of the male coupling member 5 and a flat face 11 adapted to bear against one of the surfaces 8 of the female coupling member 6, the angle between the faces 10 and 11 of the wedge 9 being equal to the angle between the surfaces 7 and 8 of the male and female coupling members.

Each wedge 9 has at its outer end a radially outward extension 12, and the female coupling member 6 has an adjustable stop screw 13 against which each extension 12 abuts when the wedge 9 is moved inwardly of the female coupling member 6. Thus the extent to which the wedge moves inwardly of the female coupling member is determined by the setting of the stop screw 13.

Each wedge 9 is mounted on the female coupling member 6 for generally longitudinal movement therealong by a dovetail connection 14. The dovetail connection 14 extends parallel to the surface 8 of the member 6 and the face 11 of the wedge 9. At each side the member 6 is provided with a recess 15 containing a compression coil spring 16 which at its inner end bears against the bottom 17 of the recess 15 and at its outer end bears against a slug 18 which in turn bears against the radially outward extension 12 of the wedge 9 as shown in FIGURE 1. Thus the wedges 9 are at all times urged outwardly by the springs 16.

Each of the wedges 9 has an opening 19 extending transversely therethrough, and a stud 20 is threadedly connected with the female coupling member 6 as shown and projects into the opening 19 whereby to limit movement of the wedge in each direction along the dovetail connection 14. Actually inward movement of the wedge 9 is limited by the stop screw 13 but outward movement is limited by the stud 20. Thus when the members of the spindle coupling are disengaged as shown in FIGURE 2 the springs 16 hold the wedges 9 in a generally outward position relative to the female coupling member 6.

When the male coupling member 5 is introduced into the female coupling member 6 the surfaces 7 are spaced inwardly from the faces 10 of the wedges 9 until the shoulder 21 of the roll engages the radially outward extensions 12 of the wedges 9 whereafter upon continued movement of the roll toward the driving spindle the roll pushes the wedges 9 along with it. But as the wedges 9 move toward the bottom of the recess or socket in the female coupling member they also move radially inwardly because of the inclination of the surfaces 8. Were it not for the stop screws 13 engaging the extensions 12 the wedges 9 would be tightly clamped between the surfaces 7 and 8. The stop screws 13 are adjusted to stop the inward movement of the wedges 9 when there is a very small clearance between the face 10 of each wedge 9 and the corresponding surface 7 of the member 5, for example, .003". This avoids binding of the roll neck in the driving spindle while at the same time providing for an effective driving connection. Thus provision is made for easy and rapid roll changes.

While I have shown and described a present preferred embodiment of the invention it is to be distinctly understood that the invention is not limited thereto but may be otherwise variously embodied within the scope of the following claims.

We claim:

1. A spindle coupling comprising a cylindrical male coupling member having a recessed portion at a side thereof providing a surface extending generally longitudinally of the male coupling member, a female coupling member having a socket receiving the male coupling member, the female coupling member having a generally longitudinally extending surface disposed opposite said surface of the male coupling member when the male coupling member is inserted into the female coupling member, the opposed surfaces of the male and female coupling members as initially formed before the male coupling member is inserted into the female coupling member being disposed at an angle to each other providing, when the male coupling member is inserted into the female coupling member, a space therebetween tapering from relatively small to relatively great width in the direction from the bottom of the socket of the female coupling member outwardly, a generally wedge-shaped device in said space connecting the coupling members to turn together when one of them is driven, said device being movable relatively to the female coupling member, and stop means limiting such relative movement.

2. A spindle coupling as claimed in claim 1 in which the male coupling member has a portion which engages the generally wedge-shaped device and pushes the generally wedge-shaped device into the space between the coupling members when the male coupling member is inserted into the female coupling member.

3. A spindle coupling as claimed in claim 1 in which the male coupling member is received directly in the socket of the female coupling member in surface-to-surface contact therewith and in which the generally wedge-shaped device is mounted on the female coupling member for generally longitudinal movement therealong, spring means are provided acting between the female coupling member and the generally wedge-shaped device urging the generally wedge-shaped device outwardly of the female coupling member and additional means are provided acting between the female coupling member and the generally wedge-shaped device limiting outward movement of the generally wedge-shaped device.

4. A spindle coupling as claimed in claim 1 in which each of the male coupling member and the female coupling member has two generally diametrically opposed flat surfaces, such surfaces of the male coupling member being parallel to each other and extending parallel to the axis of the male coupling member, two generally wedge-shaped devices are provided which are mounted on the female coupling member for generally longitudinal movement therealong, the male coupling member has a portion which engages the generally wedge-shaped devices and pushes them into the spaces between the coupling members when the male coupling member is inserted into the female coupling member and spring means are provided acting between the female coupling member and each of the generally wedge-shaped devices urging the generally wedge-shaped devices outwardly of the female coupling member.

5. A spindle coupling as claimed in claim 1 in which each of the male coupling member and the female coupling member has two generally diametrically opposed flat surfaces, such surfaces of the male coupling member being parallel to each other and extending parallel to the axis of the male coupling member, two generally wedge-shaped devices are provided which are mounted on the female coupling member for generally longitudinal movement therealong, the male coupling member has a portion which engages the generally wedge-shaped devices and pushes them into the spaces between the coupling members when the male coupling member is inserted into the female coupling member, spring means are provided acting between the female coupling member and each of the generally wedge-shaped devices urging the generally wedge-shaped devices outwardly of the female coupling member and additional means are provided acting between the female coupling member and the generally wedge-shaped devices limiting outward movement of the generally wedge-shaped devices.

6. A spindle coupling as claimed in claim 1 in which each of the male coupling member and the female coupling member has two generally diametrically opposed flat surfaces, such surfaces of the male coupling member being parallel to each other and extending parallel to the axis of the male coupling member, two generally wedge-shaped devices are provided which are mounted on the female coupling member for generally longitudinal movement therealong, the male coupling member has a portion which engages the generally wedge-shaped devices and pushes them into the spaces between the coupling members when the male coupling member is inserted into the female coupling member, spring means are provided acting between the female coupling member and each of the generally wedge-shaped devices urging the generally wedge-shaped devices outwardly of the female coupling member, each of the generally wedge-shaped devices has an opening extending transversely therethrough and studs are connected with the female coupling member projecting into said openings to limit movement of the generally wedge-shaped devices relatively to the female coupling members.

7. A spindle coupling comprising a cylindrical male coupling member having a recessed portion at a side thereof providing a surface extending generally longitudinally of the male coupling member, a female coupling member having a socket receiving the male coupling member, the female coupling member having a generally longitudinally extending surface disposed opposite said surface of the male coupling member when the male coupling member is inserted into the female coupling member, the opposed surfaces of the male and female coupling members being disposed at an angle to each other providing, when the male coupling member is inserted into the female coupling member, a space therebetween tapering from relatively small to relatively great width in the direction from the bottom of the socket of the female coupling member outwardly and a generally wedge-shaped device in said space connecting the coupling members to turn together when one of them is driven, the coupling having a longitudinal sliding dovetail connection between the generally wedge-shaped device and one of the coupling members whereby the generally wedge-shaped device is adapted to slide into and substantially fill the space between the coupling members when the male coupling member is inserted into the female coupling member.

8. A spindle coupling comprising a cylindrical male coupling member having a recessed portion at a side thereof providing a surface extending generally longitudinally of the male coupling member, a female coupling member having a socket receiving the male coupling member, the female coupling member having a generally longitudinally extending surface disposed opposite said surface of the male coupling member when the male coupling member is inserted into the female coupling member, the opposed surfaces of the male and female coupling members being disposed at an angle to each other providing, when the male coupling member is inserted into the female coupling member, a space therebetween tapering from relatively small to relatively great width in the direction from the bottom of the socket of the female coupling member outwardly and a generally wedge-shaped device in said space connecting the coupling members to turn together when one of them is driven, the generally wedge-shaped device being mounted on the female coupling member for generally longitudinal movement therealong and having an opening extending transversely therethrough and a stud being connected with the female coupling member and projecting into said opening to limit movement of the generally wedge-shaped device relatively to the female coupling member.

References Cited by the Examiner
UNITED STATES PATENTS

| | | | |
|---|---|---|---|
| 1,081,527 | 12/1913 | Franz | 279—87 |
| 1,412,235 | 4/1922 | Felix | 279—87 |
| 2,303,495 | 12/1942 | Ranney | 279—87 |
| 2,919,137 | 12/1959 | Hollingsworth | 279—87 |

LESTER M. SWINGLE, *Primary Examiner.*

ROBERT C. RIORDON, *Examiner.*